United States Patent [19]

Pawelzik et al.

[11] Patent Number: 4,535,814

[45] Date of Patent: Aug. 20, 1985

[54] LEVER HEAD FOR SINGLE-LEVER MIXING VALVES

[75] Inventors: Manfred Pawelzik, Soest; William P. Herring, Hemer; Jan R. Kostorz, Menden, all of Fed. Rep. of Germany

[73] Assignee: Friedrich Grohe Armaturenfabrick GmbH & Co., Hemer, Fed. Rep. of Germany

[21] Appl. No.: 522,026

[22] Filed: Aug. 11, 1983

[30] Foreign Application Priority Data

Aug. 19, 1982 [DE] Fed. Rep. of Germany ....... 3230815

[51] Int. Cl.³ .................... F16K 11/02; F16K 31/54
[52] U.S. Cl. ...................... 137/625.17; 137/636.3; 251/250; 251/288
[58] Field of Search ............ 137/625.17, 636.2, 636.3, 137/636.4; 251/248, 250, 288

[56] References Cited

U.S. PATENT DOCUMENTS

| | | | |
|---|---|---|---|
| 1,641,561 | 9/1927 | Whidden | 137/636.3 |
| 2,038,943 | 4/1936 | Fountain | 137/636.3 |
| 2,204,257 | 6/1940 | Powers | 137/636.3 |
| 2,238,916 | 4/1941 | Powers | 137/636.3 |
| 2,519,448 | 8/1950 | Fairchild | 137/636.3 |
| 2,589,857 | 3/1952 | Pena | 137/636.3 |
| 2,633,872 | 4/1953 | Hennessey | 137/636.3 |
| 2,838,070 | 6/1958 | Williams | 137/636.3 |
| 3,287,985 | 11/1966 | Moen | 137/625.17 |
| 3,678,961 | 7/1972 | Grosche | 137/636.2 |

FOREIGN PATENT DOCUMENTS

| | | | |
|---|---|---|---|
| 2301756 | 9/1976 | France | |
| 2415769 | 8/1979 | France | |
| 104548 | 5/1942 | Sweden | 137/636.3 |

Primary Examiner—Alan Cohan
Assistant Examiner—John A. Rivell
Attorney, Agent, or Firm—Karl F. Ross; Herbert Dubno

[57] ABSTRACT

An improved lever head for a single handle mixing faucet of the type wherein the hand lever is brought out of the body at right angles to the valve slides is described. Volume adjustments are made by swiveling the handle from side to side whereas mixing adjustments are made by rotating the hand lever about its longitudinal axis.

18 Claims, 7 Drawing Figures

LEVER HEAD FOR SINGLE-LEVER MIXING VALVES

FIELD OF THE INVENTION

This invention pertains to a lever head for single-lever mixing valves for sanitary use for regulating the mixture and volume flowing of cold and hot water with a hand lever wich may be pivoted ar right angles to the valve slide.

BACKGROUND OF THE INVENTION

Lever head designs of this kind are well known, for example, from the German patents DE-PS No. 17 59 520 and, DE-PS No. 26 58 022. In the case of the well known mixing valves, the mixing ratio and the volume can be determined with the hand lever which is arranged to move with two degrees of freedom. In these cases, the mixing ratio is determined by turning the lever head or swiveling the hand lever about the central axis of the lever head, while the total volume flowing is determined by up and down movement of the hand lever parallel to the central axis. This correlation of the two degrees of freedom of the hand lever often leads to undesirable overlapping of the two adjusting movements when operating the valve. When an adjustment is being made to alter the volume flow rate, it is easy for the lever head to be swiveled also, so that besides making the desired volume change, an undesirable change of the mixing ratio occurs at the same time. It is also easy when changing the mixing ratio for a preset volume to be changed undesirably.

OBJECTS OF THE INVENTION

One object of the invention is to provide a lever head for sanitary mixing valves which will largely exclude undesirable overlapping of the two valve control settings due to the hand lever being movable with two degrees of freedom.

Another object is to provide an improved lever head so that the valve control setting can be achieved with precision and ease.

SUMMARY OF THE INVENTION

In accordance with the principles of the invention, a lever head is provided wherein control settings for adjusting the mixing ratio of hot and cold water is produced by turning the hand lever about its longitudinal axis and the control settings for adjusting the volume flow being produced by swiveling the lever about a pivot on the valve body.

In contrast to the known single lever mixing valves wherein the two control movements are carried out by swiveling movements in different planes, according to the invention, the two control movements are produced by two basically different types of movement namely, by rotary movements about the longitudinal axis of the hand lever and by swiveling the hand lever so that undesirable overlapping of the two control movements no longer occur and, in addition, a precise and easy manipulaton of the mixing valve is facilitated by the clearly separated control movements.

For mixing valves with piston or flat slide cartridges, the hand lever may advantageously be made in the form of a swiveling lever fitted in the body to produce the axial control settings, the swiveling lever being designed to take a spindle, to the outer end of which is fixed an adjusting knob, the rotary movement which can be produced with the adjusting knob being transmitted through a gear drive as a radial control setting to a piston or flat slide.

For mixing valves with flat slides which on the one hand require an axial control setting to determine the volume and, on the other hand, a radial control setting by swiveling about a pivot to determine the mixing ratio, a spherical head may in accordance with the invention be fitted to the body end of the hand lever, its spherical surface being supported in a head piece of the flat slide, thus enabling the axial control setting to be carried out with little wear taking place. For this purpose, the spherical head may be supported with a sliding shoe in a slide guide of the swiveling lever parallel to the swivel axis. The spindle and gear wheel, which are rotatbly supported in the swiveling lever, pass into a suitably designed transverse slot in the spherical head. The gear wheel engages with a toothed rack fitted in the base of the transverse slot, so that when the spindle is turned, a radial setting or swiveling movement of the flat slide is produced. Advantageously, the spindle may be fitted with an elliptical gear wheel having a correspondingly shaped toothed rack.

In the mid-range of the mixing ratio of cold and hot water—the so called comfort range—in which mixed water of about 30° to 45° C. is intended to be produced, it is possible with this arrangement for the control setting of the valve slide to be reduced or made "underproportional" relative to the angle of rotation, while at the ends of the range where only cold or hot water is drawn off, it is increased or made "overproportional" thereby permitting more precise setting or adjustment of the mixed water is possible in the comfort range.

To hold the spherical head securely to the hand lever, the spindle is passed through the transverse slot in the spherical head and provided on the opposite side with a sliding block as a support which, on the one hand is guided in the sliding block and on the other, in a longitudinal slot formed in the body, the sliding block on the spindle being pressed against the spherical head by a spring element with a stop collar to ensure axial security free from play.

Advantageously, the spindle, supported in the swiveling lever, is provided with a frictional medium such as an O-ring or flat helical spring between the swiveling lever and the adjusting knob by means of which the adjusting forces for the two different setting movements can be mutually adapted so as to ensure uniform and smooth operation of the mixing valve for both types of adjustment.

Markings and/or scales can be applied to the body and/or the swiveling lever as well as on the adjusting knob to ensure good positional indication of the valve.

BRIEF DESCRIPTION OF THE DRAWING

The invention may be better understood from a reading of the following detailed description in conjunction with the drawings in which.

SPECIFIC DESCRIPTION

Figure 1:
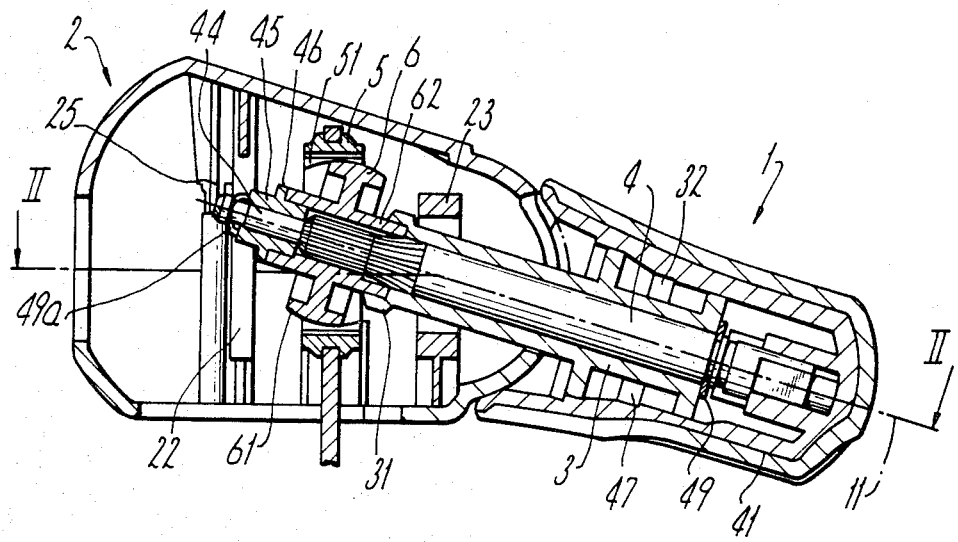
FIG. 1 is a cross-sectional view of a lever head for a flat slide sanitary mixing valve.
Figure 2:
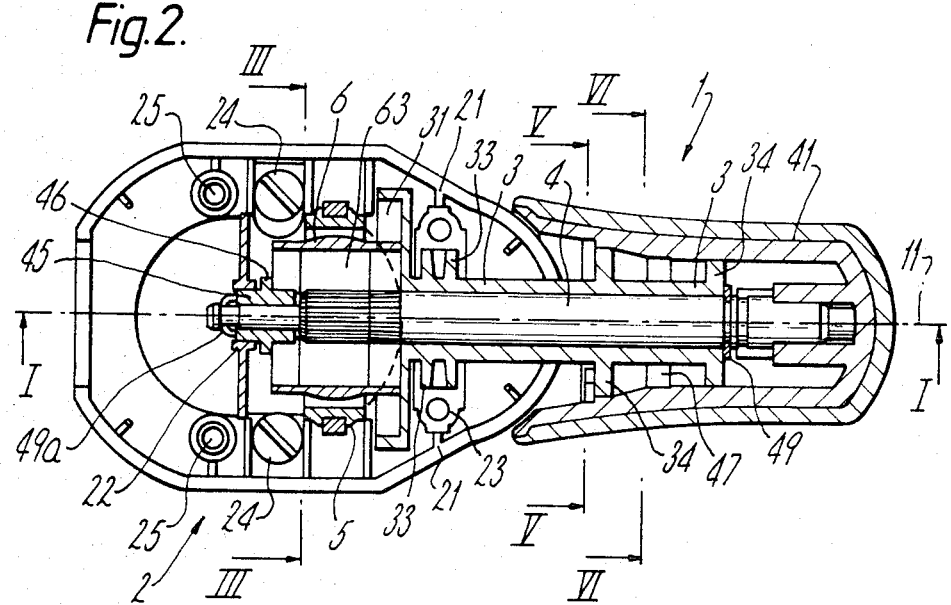
FIG. 2 is a cross-sectional view of the lever head of FIG. 1 taken along lines II—II and showing the lever head with the hand lever in the horizontal position.
Figure 2A:
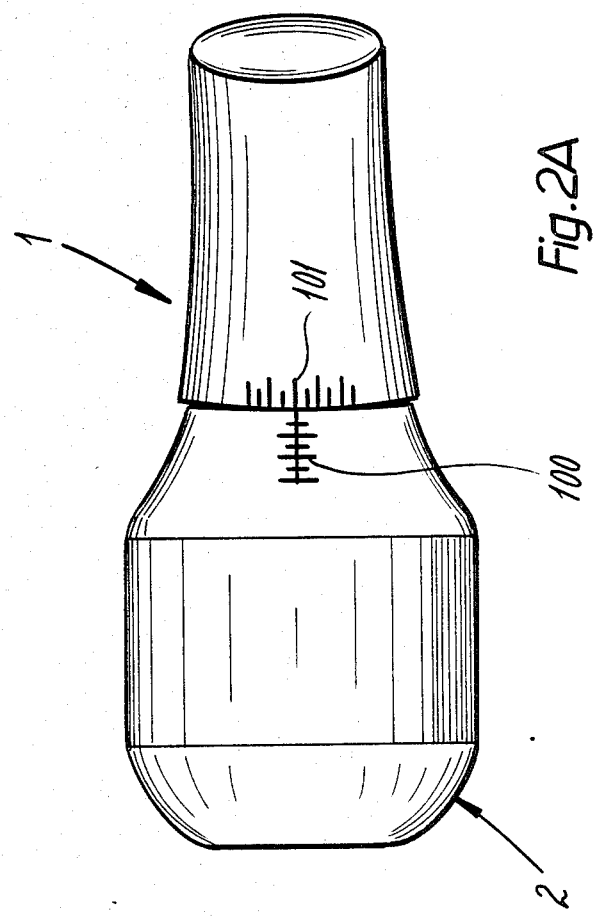
FIG. 2A is an elevational view corresponding to FIG. 2.
Figure 3:
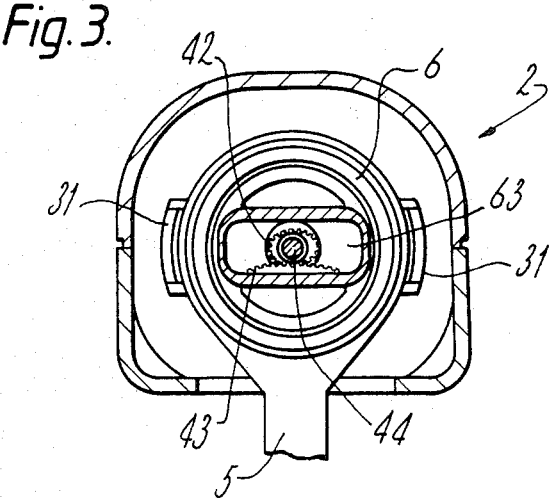
FIG. 3 is a cross-sectional view taken along line III—III of FIG. 2.
Figure 4:
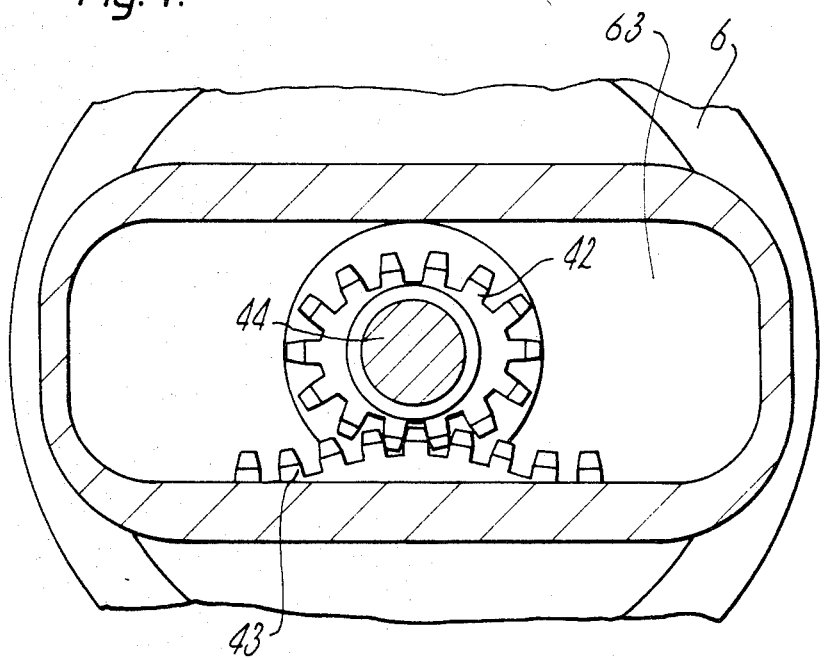
FIG. 4 is an enlarged portion of FIG. 3 showing the toothed wheel drive.

The lever head shown on the drawing is particularly suitable for sanitary mixing valves provided with a flat slide which regulates the total volume flowing by axial setting movement, and which regulates the mixing ratio of cold and hot water supply by a radial control setting as, for example, is shown in DE-PS No. 26 58 022.

The lever head consists essentially of a hand lever 1 issuing from a body 2, its end inside the body 2 being fitted with a spherical head 6 which is retained between the hand lever 1 and a head piece 5 of the valve slide by means of various slide guides. The hand lever 1 consists of a swiveling lever 3 supported on a pivot 21 in the body 2, and a spindle 4 supported in the swiveling lever 3.

A hood-shaped adjusting knob 41 is fixed by a well known method to the outer projecting end of the spindle 4 and fits around the projecting portion of the swiveling lever 3, support bearings 34 being provided on the swiveling lever 3 for secure rotary guidance. The end face against the body is shaped to conform to a hemispherical portion of the body and ensures a smooth passage of the adjusting knob 41 over the body 2 in any portion of the swiveling lever 3. The body is in two parts consisting of a basic shell and a cover shell, the basic shell being fixed to the mixing valve with screws 24. A seperable bearing 23 is fitted to the base shell and supports the swiveling lever 3 with its radial trunnions 33, allowing it to swivel about the pivot 21.

The spherical head 6 with a sliding shoe 62 fits into a sliding guide 31 to form a connection at the end of the swiveling lever 3 parallel to the pivot 21. On the other hand the spherical head is mounted with its spherical surface 61 held in a ball cup 51 which is movably pivoted in a hole in the head piece 5, so that when the swiveling lever 3 is swiveled about the pivot 21, an inner lever arm fitted in the body 2 initiates a corresponding axial control setting in the head piece 5, while the radial component is compensated by the movable ball cup 51.

The spindle 4 which is rotatably supported in the swiveling lever 3, is guided through a transverse slot 63 formed in the spherical head 6 with a pin 44 and is fitted at its end with a sliding block 45 which on the one hand is guided in the transverse slot 63 and on the other, in a longitudinal slot 22 in the body 2 at right angles to the transverse slot. The sliding block 45 is provided with a stop collar 46 for support on the spherical head 6. In order to secure the spindle 4 and the spherical head 6 axially to the sliding block 45, the outer end of the spindle 4 is retained with a snap ring 49 and the end inside the body 2 with a spring element 49a.

In the region of the transverse slot 63, the spindle 4 is fitted with an elliptical gear wheel 42 which engages with a correspondingly designed toothed rack 43 in the base of the transverse slot 63.

The lever head described above operates as follows:

When the hand lever 1 is swiveled about the pivot 21, the tangential component of the swiveling movment is initiated as an axial control setting by the spherical head 6 and the ball cup 51 in the head piece 5 of the valve slide, causing an increase or decrease of volume in the swiveling direction or the mixing valve is opened or closed respectively. The radial movement caused by the swiveling movement is harmlessly compensated by the movably supported ball cup 51 in the head piece 5. When the adjusting knob 41 is turned and with it the spindle 4 about its longitudinal axis 11, movement is transmitted through the gear wheel 42 and the toothed rack 43 as a function of the direction of rotation of the spherical head 6 in the slide guide 31 of the swiveling lever 3 parallel to the pivot and to the part of the sliding block 45 in the transverse slot 63 parallel to the pivot 21, so that the head piece 5 with its associated valve slide is correspondingly swiveled causing the mixing ratio of the suppied cold and hot water to be changed, while the total volume flowing remains more or less constant. Since the headpiece 5 of the valve slide is swiveled about a fulcrum, a correspondingly curved slide guide 31 and a correspondingly shaped transverse slot should actually be necessary. Tests have shown however, that with straight slide guides, the axial component acting on the slide is so small as to be disregarded and curved slide guides are, therefore unnecessary in the majority of applications.

The elliptical design of the gear wheel ensures that a smaller gear ratio is obtained in the preferred middle mixing range, so that in this range, a larger angle of rotation must be applied to the adjusting knob 41 relative to the valve slide movement, while at the end range settings of the valve slide where essentially only hot or cold water is drawn off the gear ratio is increased, so that for a relatively small angle of rotation of the adjusting knob 41 is relatively large adjusting movement of the valve slide is produced.

Figure 5:
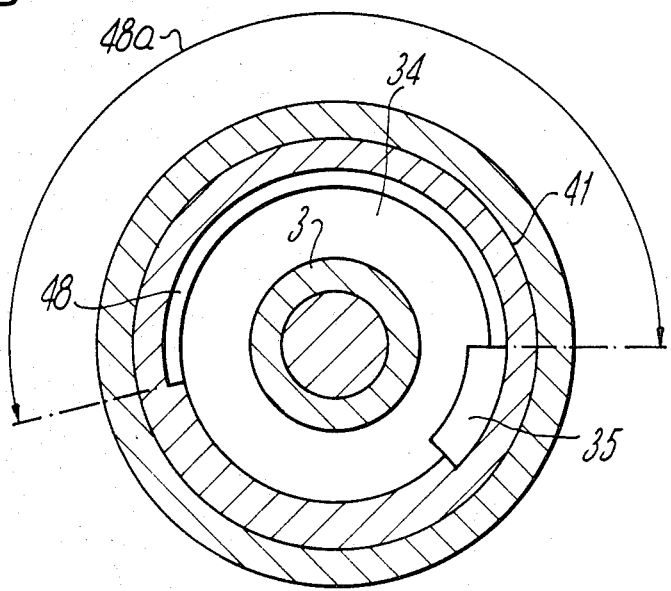
FIG. 5 is a sectional view along line V—V of FIG. 2.
Figure 6:
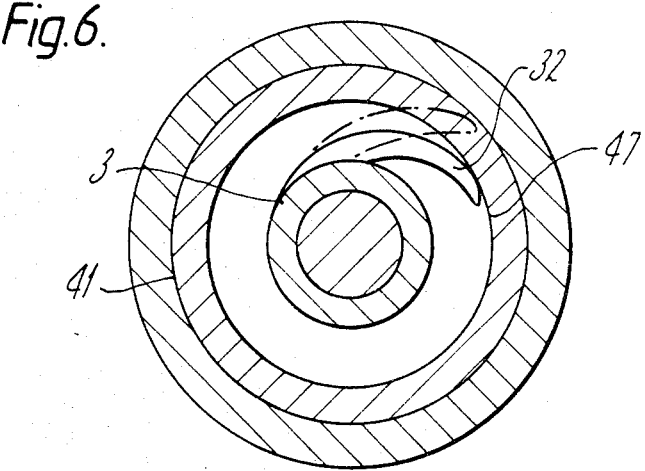
FIG. 6 is a sectional view along line VI—VI of FIG. 2.

In order to adapt and accomodate the two adjusting movements, namely swiveling about the pivot 21 to regulate the volume and rotating the adjusting knob 41 about the horizontal axis 11 to regulate the mixing ratio, the adjusting knob 41 is provided with a flat spring 32 on the surface of the swiveling lever 3 and which is pressed against an inner surface 47 of the adjusting knob 41, thus contributing a desirable and specific resistance to movement with respect to swiveling, so that for both discrete adjusting movements, roughly equal forces are required. In addition, a stop 35 is fitted to a support bearing 34 of the swiveling lever 3 and engages in a circular recess 48 in the adjusting knob 41, as is clearly shown in FIG. 5, limiting the maximum angle of rotation 48a to e.g. 205°.

The body 2 and many individual items of the lever head may be produced in plastic at very low cost using the injection moulding process. This enables the cover shell of the body 2 to be effectively fixed to the basic shell by means of snap fasteners 25.

Markings in the form of a scale can be provided at 100 and 101 in the transitional region of the head-shaped adjusting knob 1 and the body 2, respectively, to indicate the position of the valve and the mixing ratio and water temperature.

What is claimed is:

1. In a lever head for a single-lever mixing valve for sanitary use for regulating the mixing and volume flowing of cold and hot water with a hand lever which is pivoted substantially at right angles to a valve slide, the improvement wherein said valve slide is mounted for axial displacement and swinging movement transverse to said axial displacement in a plane thereof, and the control settings for adjusting the mixing ratio of cold and hot water are produced by turning the hand lever about its longitudinal axis to effect said swinging movement independently of said axial displacement and the control settings for adjusting the volume flow are produced by swivelling the lever about a pivot on the body to effect said axial displacement independently of said swinging movement.

2. A lever head for use with a mixing valve having a head piece movable reciprocably in an axial direction and pivotally transversely of said axial direction to control the position of a valve, said lever head comprising:
   a body covering said headpiece;
   a hand lever comprising a swiveling lever, means for pivotally coupling said lever to said body to permit swiveling motion about a swivel axis in a fixed plane relative to said body, a spindle extending through said swiveling lever and rotatable therein, and an adjusting knob coupled to one end of said spindle;
   said spindle being coupled to said head piece by a gear drive; and
   whereby swivel motion of said swivel lever moves said head piece reciprocably in said axial direction and rotational movement of said spindle moves said head piece transversely and independently of the movement of said head piece by said swivel motion.

3. A lever head in accordance with claim 2, wherein said pivot comprises a bearing fitted in the wall of said body.

4. A lever head in accordance with claim 2, wherein said pivotally coupling means comprises a bearing made up of half shells joined together and arranged separately in said body, and wherein said swiveling lever is guided in said bearing by radial trunnions.

5. A lever head in accordance with claim 4, wherein said body is hemispherical in the region of said bearing the center point of the sphere lying on the intersection of the axes in said bearing and wherein said adjusting knob is guided on this region.

6. A lever head in accordance with claim 5, wherein said body comprises a basic shell and a cover shell, said basic shell serving mainly to support the bearing and guiding arrangements of said lever head and being fastened to the valve, said cover shell serving mainly to seal off said basic shell and being attached to said basic shell with snap fasteners.

7. A lever head for use with a mixing valve having a head piece movable reciprocably in an axial direction and pivotally transversely of said axial direction to control the position of a valve, said lever head comprising:
   a body covering said headpiece;
   a hand lever comprising a swiveling lever, means for pivotally coupling said lever to said body to permit swiveling motion about a swivel axis in a fixed plane relative to said body, a spindle extending through said swiveling lever and rotatable therein, and an adjusting knob coupled to one end of said spindle;
   said spindle being coupled to said headpiece by a gear drive; and
   whereby swivel motion of said swivel lever moves said head piece reciprocably in said axial direction and rotational movement of said spindle moves said head piece transversely and independently of the movement of said head piece by said swivel motion said hand lever further comprising a head having a spherical face, said headpiece being adapted to engage said head, said head being guided parallel to said swivel axis by a sliding shoe in a sliding guide, and said spherical head having a transverse slot positioned parallel to the sliding surfaces of said sliding shoe and in which said spindle is mounted, whereby rotary motion of said spindle causes transverse motion of said sliding shoe.

8. A lever head in accordance with claim 7, wherein said gear drive comprises a toothed wheel drive.

9. A lever head in accordance with claim 8, wherein said toothed wheel drive comprises an elliptical gear wheel fitted to said spindle and a correspondingly designed toothed rack in the base of said transverse slot.

10. A lever head in accordance with claim 9, wherein said spindle is guided through said transverse slot by a pin and being fitted with a sliding block, said sliding block being guided in said transverse slot, said body comprising a longitudinal slot for further guiding said sliding block.

11. A lever head in accordance with claim 10, wherein said sliding block comprises a stop collar for said spherical head with said sliding shoe, said lever head includes means for axially securing said sliding block on said spindle.

12. A lever head in accordance with claim 11, comprising a frictional medium between said swiveling lever and said adjusting knob to provide a definite resistance to movement of the spindle.

13. A lever head in accordance with claim 12, wherein said adjusting knob is hood-shaped surrounding the portion of said swiveling lever which projects from said body.

14. A lever in accordance with claim 12, wherein said frictional medium comprises an O-ring.

15. A lever head in accordance with claim 13, wherein said one or more helical flat springs comprises frictional medium disposed against the internal surfaces of said hood-shaped adjusting knob.

16. A lever head in accordance with claim 2, comprising markings and/or a scale in the transitional region of the adjusting knob and the swiveling lever to indicate the mixing ratio and the mixed water temperature.

17. A lever head in accordance with claim 13, comprising markings and/or scales being provided in the transitional region of said hood-shaped adjusting knob and the body to indicate the position of the valve.

18. A lever head in accordance with claim 13, comprising support bearings for guiding said knob; and
   stops on said swiveling lever for limiting the rotary movement of said adjusting knob.

* * * * *